United States Patent

Ishibashi et al.

[11] Patent Number: 5,808,979
[45] Date of Patent: Sep. 15, 1998

[54] TRACKING ERROR SIGNAL DETECTOR

[75] Inventors: Hiromichi Ishibashi, Ibaraki; Osamu Yamaguchi, Hirakata; Yoshihiro Kanda, Osaka-fu, all of Japan

[73] Assignee: Matsushita Electric Industrial Co., Ltd., Osaka-fu, Japan

[21] Appl. No.: 561,920

[22] Filed: Nov. 22, 1995

[30] Foreign Application Priority Data

Nov. 25, 1994 [JP] Japan .................................. 6-291044

[51] Int. Cl.$^6$ ........................................................ G11B 7/00
[52] U.S. Cl. .................................. 369/44.35; 369/44.41; 369/124; 369/59
[58] Field of Search .......................... 369/44.41, 44.35, 369/44.29, 44.36, 124, 50, 59; 250/202; 324/76.77, 76.82

[56] References Cited

U.S. PATENT DOCUMENTS

| | | | |
|---|---|---|---|
| 4,467,462 | 8/1984 | Shibata | 369/44.34 X |
| 4,488,276 | 12/1984 | Tanaka | 369/44.35 X |
| 4,740,940 | 4/1988 | Tanaka | 369/44.35 X |
| 4,785,441 | 11/1988 | Tanaka | 369/44.41 X |
| 5,005,163 | 4/1991 | Yamamoto | 369/44.36 |
| 5,130,963 | 7/1992 | Kusano | 369/44.41 X |
| 5,132,948 | 7/1992 | Ishibashi | 369/44.41 X |
| 5,210,732 | 5/1993 | Suenaga | 369/44.36 X |
| 5,436,877 | 7/1995 | Ohshima | 369/44.35 |

OTHER PUBLICATIONS

Principles of Optical Disc Systems, by G. Bouchiew et al. pp. 136–139, Dec. 1985.

*Primary Examiner*—Aristotelis M. Psitos
*Assistant Examiner*—A. Faber
*Attorney, Agent, or Firm*—Wenderoth, Lind & Ponack, L.L.P.

[57] ABSTRACT

An apparatus for outputting a tracking error signal based on the time change in the intensity distribution of a laser beam diffracted by the data pits is provided for an optical reproduction system using an optical record carrier on which data is recorded with a high recording density. The photodetector is divided orthogonally into four parts, and boost filters having identical characteristics are disposed for the output signal of one pair of diagonally located photodetector elements and for the output signal of the other pair of diagonally located photodetector elements. The detection gain of the short mark reproduction signal can thus be increased above the detection gain of the long mark reproduction signal to prevent the loss of short marks and improve the S/N ratio of the tracking error signal.

5 Claims, 8 Drawing Sheets

TRACKING ERROR SIGNAL DETECTOR

BACKGROUND OF THE INVENTION

1. Field of the Invention

The present invention relates to a tracking error signal detector and, more particularly, to an apparatus for outputting a tracking error signal in an optical reproduction system using an optical record carrier to which information is recorded at a high recording density by detecting, from the phase difference between divided photodetector elements, the reading position of the laser beam relative to the position of the track to which the information is recorded.

2. Description of the Related Art

An optical disk drive apparatus with the functionality related to the present invention as described above has been disclosed in U.S. Pat. No. 4,467,462 (Aug. 21, 1984) and is described below.

A focused laser beam is emitted to a rotating optical record carrier, and a photodetector disposed to the far field area converts the reflected beam to an electrical signal group. These photodetectors are divided into four parts by two lines orthogonal to each other, and each of these four component elements outputs separately. When the laser beam scans the area near the information tracks of the optical record carrier, the reflected light also contains diffraction and interference components which are caused by the data pits forming the information track, thus creating an irregular power distribution in the far field area of the images.

When the laser beam scans precisely over the center of the information track, the power distribution changes symmetrically to a tangential line of the track center. When the laser beam scans a line offset from the track center, the changes in the power distribution occur in a rotating manner about the optical axis of the reflected light (the direction of this rotation is clockwise or counterclockwise depending upon the direction of the track offset). This rotation is detected as the phase difference of the sum of signals of the diagonally located photodetector elements. Mote specifically, if the four photodetector elements are labelled A, B, C, and D (clockwise) and the respective output signals are $S_A$, $S_B$, $S_C$, and $S_D$, the sum of signals $S_A+S_C$ and $S_B+S_D$ are digitized using an appropriate threshold value to generate pulse signals. These pulse signals are then phase compared, and the noise component is removed from the phase comparator output using a low-pass filter to obtain a signal corresponding to the positioning error between the laser beam and the track center. This signal is the tracking error signal.

The problem with this method is that tracking error signal detection noise increases as the data recording density increases.

Generally speaking, information is recorded on the data tracks as a series of pits (logic value=1) and lands (the area between the pits;=0) arranged in groups of long marks (e.g., ..111100000..) or short marks (e.g., ..1010101..). Because there is a limit to the recognition resolution of the reading of the laser beam, increasing the recording density tends to decrease the amplitude of the reproduced signal. Note that this amplitude drop is particularly pronounced with the shortest marks. When a long continuous mark series is recorded near a short mark series (e.g., 11111110100000), the short mark is absorbed in the long mark due to strong intersymbol interference, and it becomes difficult to separate the short and long marks. When the tracking error signal is obtained using the conventional method from the signal obtained by scanning this pit-land series, the amplitude of the short mark reproduction component becomes the same as the noise level. When a digital pulse signal is then obtained, these short mark components may or may not exceed the threshold value. An error is thereby introduced to the pulse signals used for phase comparison, causing false detection of the tracking error signal and resulting in pronounced noise in the tracking error signal.

SUMMARY OF THE INVENTION

Therefore, an object of the present invention is to prevent the loss of short mark reproduction components and to improve the signal-to-noise (S/N) ratio of the tracking error signal by providing discrete boost filters of the phase lead/lag type having identical characteristics for the output signal from one pair of diagonally located photodetector elements and the output signal for another pair of diagonally located photodetector elements, and by increasing the detection gain of the short mark reproduction signal relative to the detection gain of the long mark reproduction signal. A further object of the present invention is to realize a phase comparator generating minimal noise even when signal loss occurs, and thereby achieve a high S/N ratio.

The first embodiment of the present invention describes an apparatus whereby the output signals of each photodetector element pair are supplied to primary lead lag filters which have identical operating characteristics, the filter outputs are then digitized, and the digitized signals are phase compared.

The second embodiment of the present invention describes an apparatus whereby a phase lead filter is provided for each photodetector element, the phase lead filters for adjacent photodetector elements in a direction parallel to the track have mutually identical characteristics, the phase lead filters for adjacent photodetector elements in a direction perpendicular to the track have mutually different characteristics, and the signal phases of the output signals from the phase lead filters for the two pairs of diagonally located photodetector elements are compared.

The third embodiment of the present invention describes a phase comparator related to the first and second embodiments mentioned above. Specifically, a phase comparator is provided for generating a noise signal of a pulse width that is at most equal to the pulse width of the pulse signal supplied to a first input when pulse loss occurs in the pulse signal supplied to the other input.

BRIEF DESCRIPTION OF THE DRAWINGS

The present invention will become more fully understood from the detailed description given below and the accompanying diagrams.

DESCRIPTION OF PREFERRED EMBODIMENTS

A tracking error signal detector for detecting a tracking error signal from a high density optical record carrier according to the first embodiment of the present invention is described below with reference to FIG. 1.

Figure 1:
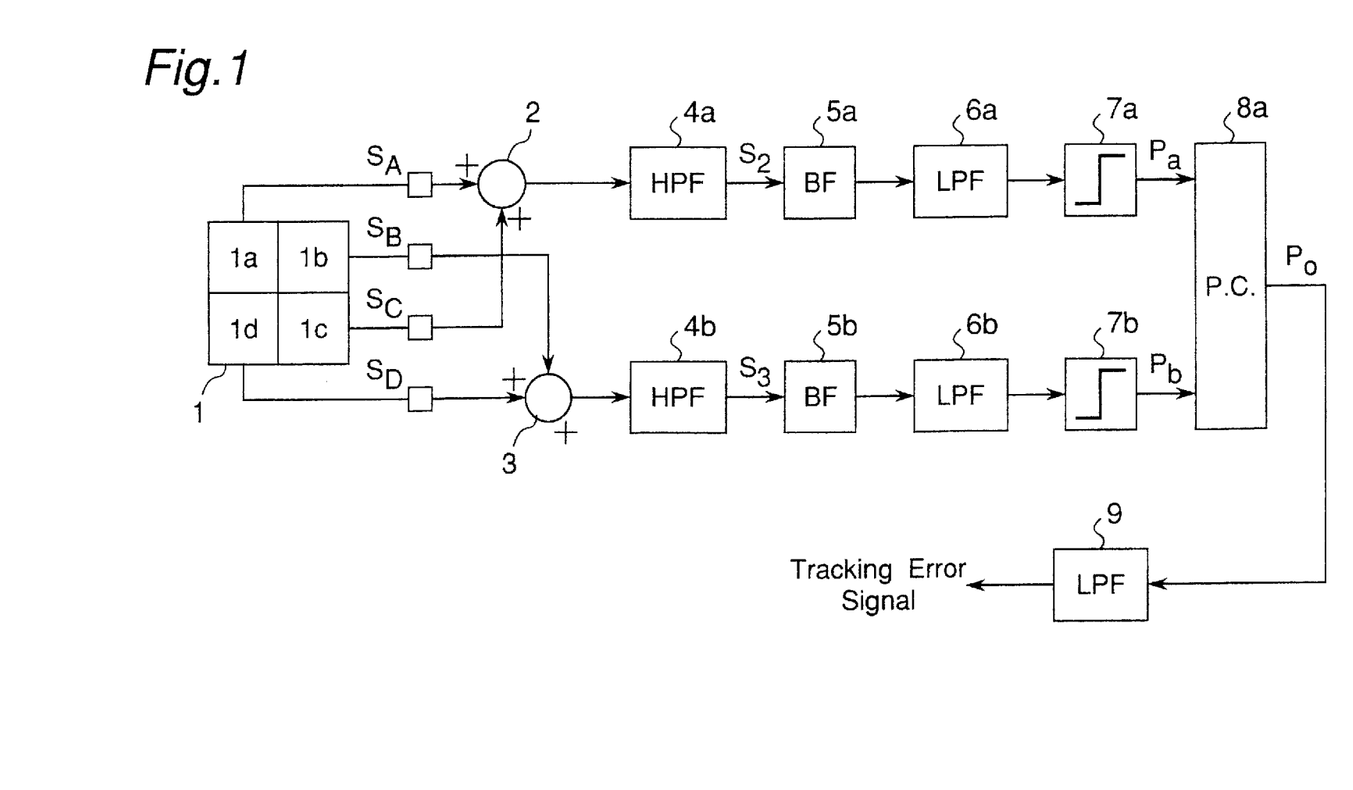
FIG. 1 is a block diagram of an apparatus for detecting a tracking error signal from a high density optical record carrier according to the first embodiment of the present invention.
Figure 7:
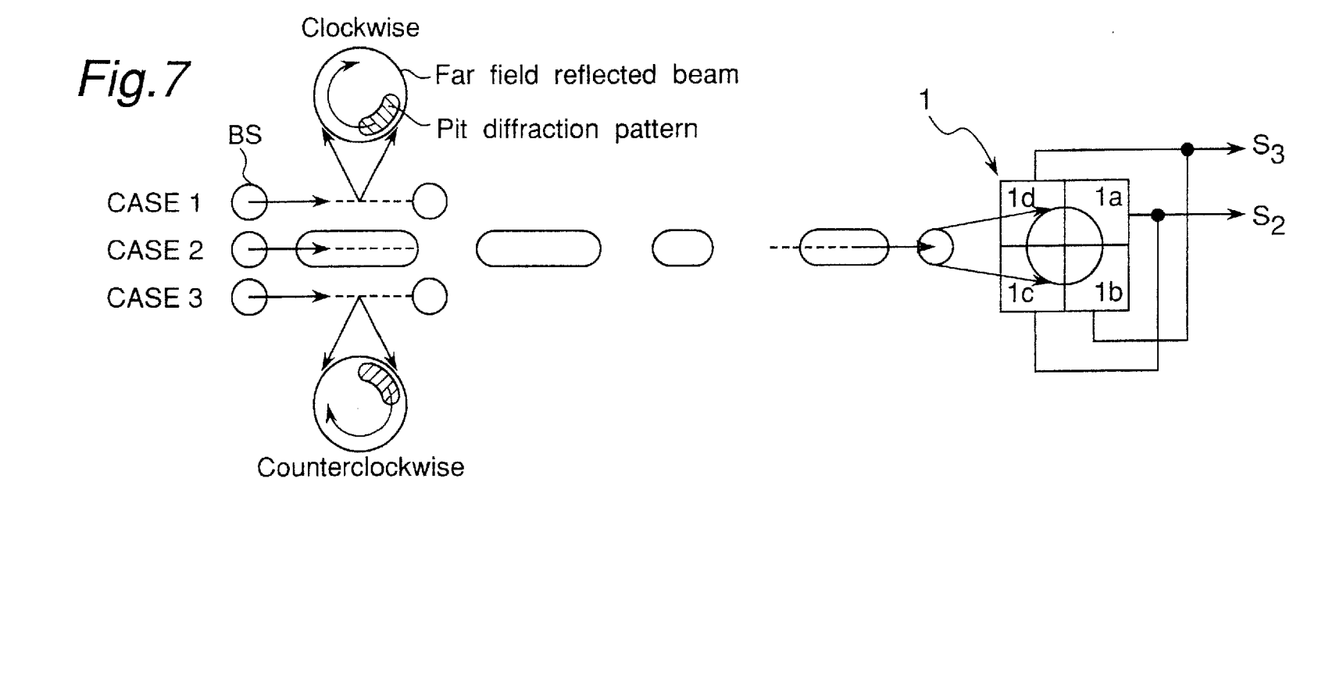
FIG. 7 is a diagram showing the relationship between a beam spot and a photodetector.

As shown in FIG. 1, a photodetector 1 comprises four photodetector elements 1a, 1b, 1c, and 1d, which are separated by parting lines orthogonal to each other. As shown in FIG. 7, the photodetector 1 is disposed in the light path in the far field area of the reflection beam produced by emitting the laser beam to the area of the information track on the optical disc. The optical disc rotates at a known velocity, and the light reflected from the optical disc is diffracted by the information bits which are recorded on the information track. This causes the light intensity that is detected by the photodetector elements to vary, and the detected light intensity levels are output by the photodetector elements as electrical signals $S_A$, $S_B$, $S_C$, and $S_D$. The photodetector 1 is disposed such that the intersection of the orthogonal parting lines is near the center of the optical axis of the laser beam. Furthermore, the photodetector 1 is disposed such that the parting line which parts photodetector elements 1a and 1b from photodetector elements 1c and 1d is perpendicular to the track center line in the track reflection, and the parting line, referred to as an axis of the photodetector 1, parting photodetector elements 1a and 1d from photodetector elements 1b and 1c is parallel to the track center line.

Adders 2 and 3 respectively combine the outputs of diagonally located photodetector elements 1a and 1c ($S_A$ and $S_C$, respectively) and photodetector elements 1b and 1d ($S_B$ and $S_D$, respectively), and outputs the diagonal sum signals $S_A+S_C$, and $S_B+S_D$.

Respective high-pass filters 4a and 4b then remove the dc component from these diagonal sum signals $S_A+S_C$, and $S_B+S_D$.

Digitizing units 7a and 7b set an appropriate threshold value from the diagonal sum signals $S_A+S_C$, and $S_B+S_D$, and generate HIGH or LOW digital pulse signals Pa and Pb, respectively.

Phase comparator 8a then detects a phase difference between the pulse signals Pa and Pb, and outputs a phase difference signal Po indicative of the direction and magnitude of a tracking error.

The phase difference signal Po is filtered by a low-pass filter 9 to remove the ripple noise component and a tracking error signal is then produced.

Figure 2A:
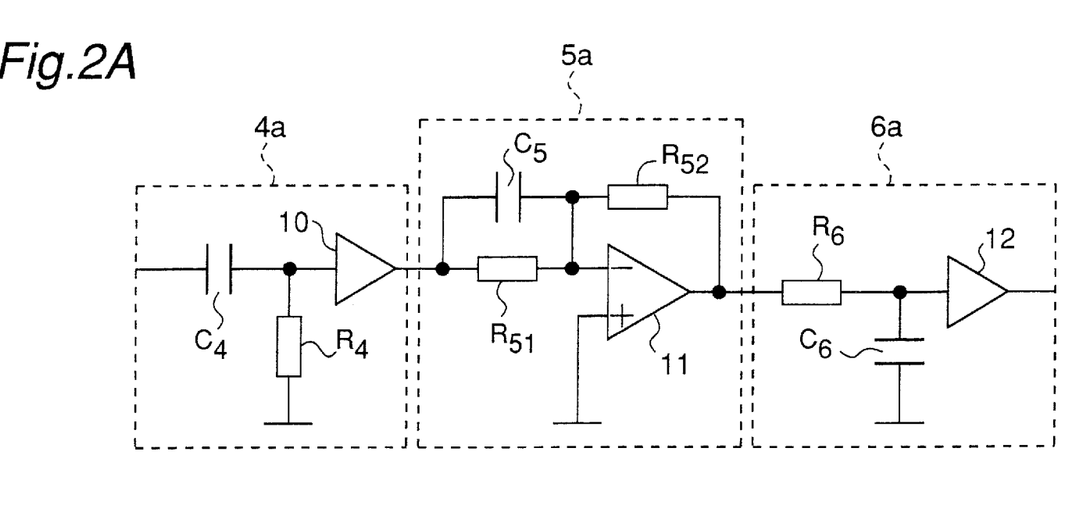
FIG. 2A is a circuit diagram of filters shown in FIG. 1.

The present invention differs from the prior art by further passing the diagonal sum signals $S_A+S_C$, and $S_B+S_D$, respectively, through boost filters 5a and 5b of a phase lead type or phase lead/lag type, and low-pass filters 6a and 6b, before waveform processing. The specific constitutions of high-pass filter 4a, boost filter 5a, and low-pass filter 6a in the present embodiment are shown in FIG. 2A. It is to be noted that high-pass filter 4b, boost filter 5b, and low-pass filter 6b are also constituted as shown in FIG. 2A.

Figure 2B:
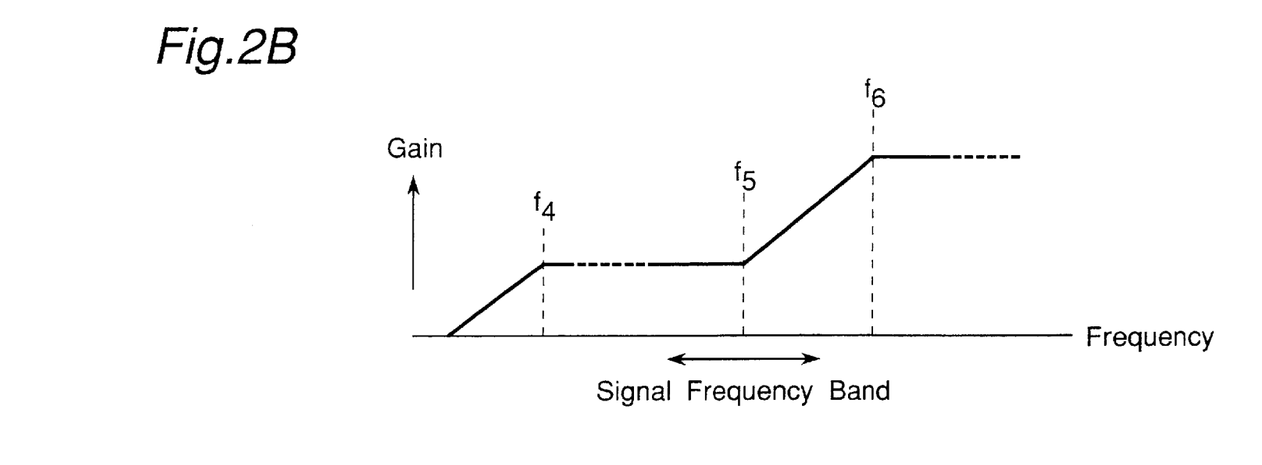
FIG. 2B is a graph showing transfer characteristics of the filters shown in FIG. 2A.

As shown in FIG. 2A, the high-pass filter 4a comprises a resistor $R_4$, a capacitor $C_4$, and a buffer 10. As shown in FIG. 2B, a cut-off frequency $f_4$ of the high-pass filter 4a is defined as $$f_4 = 1/(2\pi R_4 C_4). \tag{1}$$

Boost filter 5a comprises resistors $R_{51}$ and $R_{52}$, capacitor $C_5$, and a feed-back amplifier 11. The boost filter transfer function G is defined as $$G = G_0(1+jf/f_5) \tag{2}$$

where $G_0 = R_{52}/R_{51}$, and $f_5$ is the cut-off frequency $$f_5 = 1/(2\pi R_{51} C_5). \tag{3}$$

The low-pass filter 6a comprises a resistor $R_6$, a capacitor $C_6$, and a buffer 12. A cut-off frequency $f_6$ is defined as $$f_6 = 1/(2\pi R_6 C_6). \tag{4}$$

The high-pass filter 4a first removes the DC component from the read signal in order to facilitate A/D conversion. The cut-off frequency $f_4$ of the high-pass filter 4a is therefore set to a value sufficiently lower than the signal frequency band.

Figure 4:
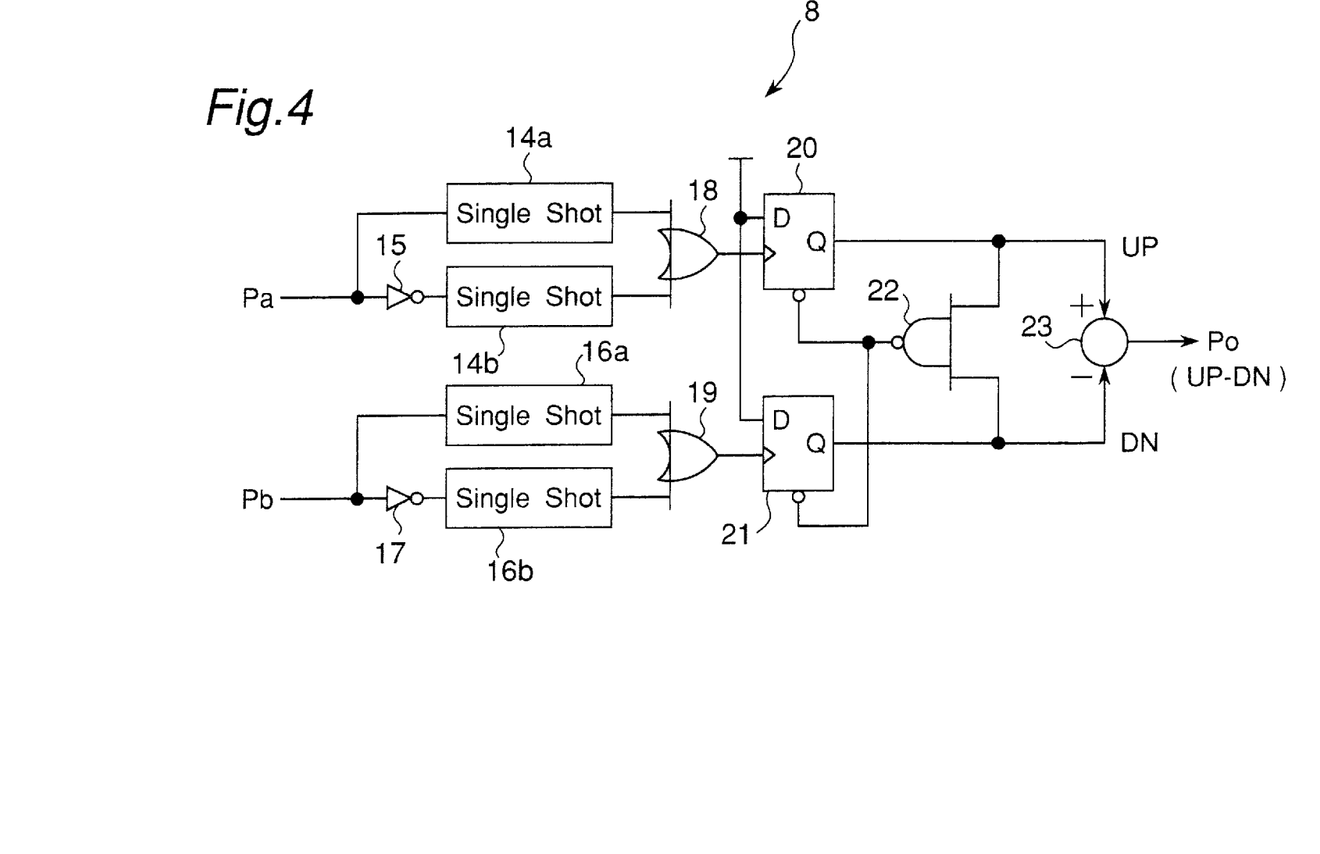
FIG. 4 is a schematic diagram of a typical phase comparator.

Referring to FIG. 4, a detail diagram of the phase comparator 8 is shown. The phase comparator 8 shown in FIG. 4 is of a type normally used for a phase-locked loop. Single shot vibrators 14a and 16a operate in response to the leading edge of the pulse signals Pa and Pb, respectively. Single shot vibrators 14b and 16b coupled with inverters 15 and 17, respectively, operate in response to the trailing edge of the pulse signals Pa and Pb. The OR gate 18 produces a single shot pulse at the leading edge and also at the trailing edge of the pulse signal Pa. Similarly, the OR gate 19 produces a single shot pulse at the leading edge and also at the trailing edge of the pulse signal Pb. The phase comparator 8 further has flip-flops 20 and 21, an AND gate 22 and a subtractor 23.

Figure 8A:
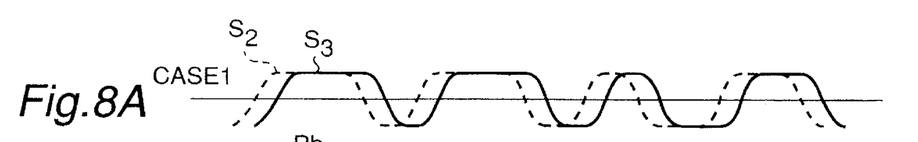
FIGS. 8A, 8B, 8C and 8D are graphs showing signals obtained when the beam spot is off the track on one side.
Figure 8B:
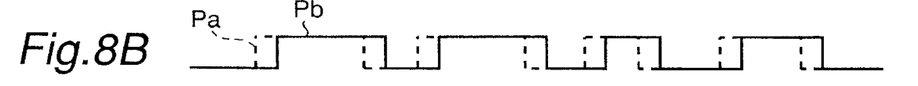
Figure 8C:
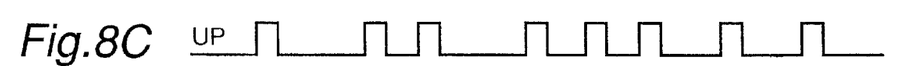
Figure 8D:
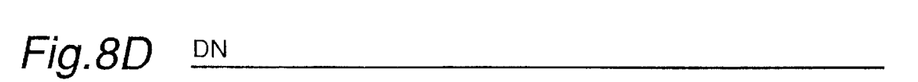
Figures 9A, 9B:
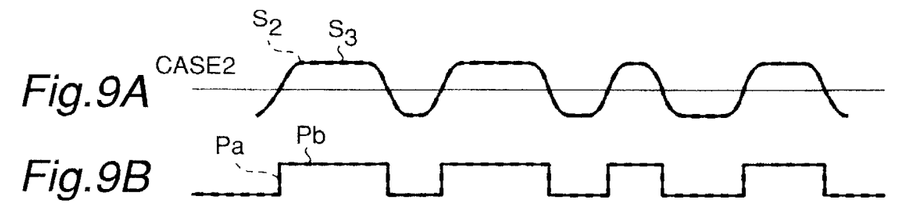
FIGS. 9A, 9B, 9C and 9D are graphs showing signals obtained when the beam spot is on the track.
Figure 9C:
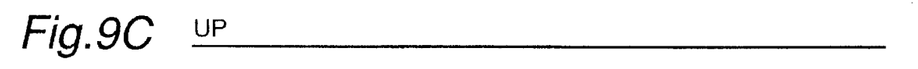
Figure 9D:
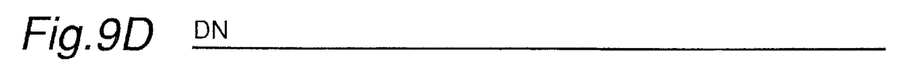

When pulse Pa is leading and pulse Pb is lagged, as shown in FIG. 8B, a flip-flop 20 is set in response to the first (leading edge of signal Pa) single shot from the OR gate 18, so that the Q terminal thereof produces a HIGH level signal. Then, after the time interval equal to the delay of pulse Pb from pulse Pa, a flip-flop 21 is set in response to the first (leading edge of signal Pb) single shot from the OR gate 19, so that the Q terminal thereof produces a HIGH level signal, which in turn causes AND gate 22 to produce a reset pulse (LOW level signal) to flip-flops 20 and 21. Thus, flip-flop 20 stops producing the HIGH level signal, resulting in a generation of a pulse UP with a pulse width equal to the time or phase difference between the leading edges of the pulses Pa and Pb, such as shown in FIG. 8C. In a similar manner, another pulse UP is produced from flip-flop 20 in response to the trailing edges of the pulses Pa and Pb.

Figure 10A:
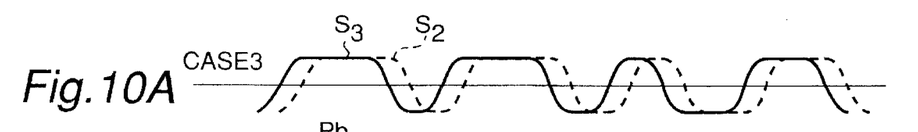
FIGS. 10A, 10B, 10C and 10D are graphs showing signals obtained when the beam spot is off the track on the other side.
Figure 10B:
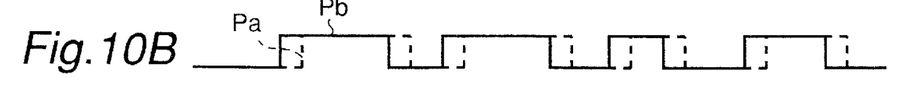
Figure 10C:
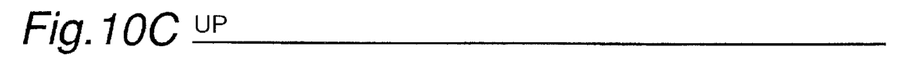
Figure 10D:
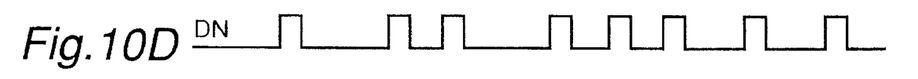

On the other hand, when pulse Pb is leading and pulse Pa is lagged, such as shown in FIG. 10B, a similar operation as described above take place, but this time the flip-flop 21 produces a pulse DN with a pulse width equal to the time or phase difference between the leading edges of the pulses Pb and Pa, such as shown in FIG. 10C.

The subtractor 23 subtracts the signal DN from signal UP and produces a difference signal Po. As shown in FIGS. 11B and 11C, when pulses UP are produced, pulses DN will not be produced; and when pulses DN are produced, pulses UP will not be produced. Thus, subtractor 23 produces a difference signal which is a combination of the pulses UP from flip-flop 20 as they are, and an invertion of pulses DN from the flip-flop 21 as the negative pulses, as shown in FIG. 11D.

Figure 11A:
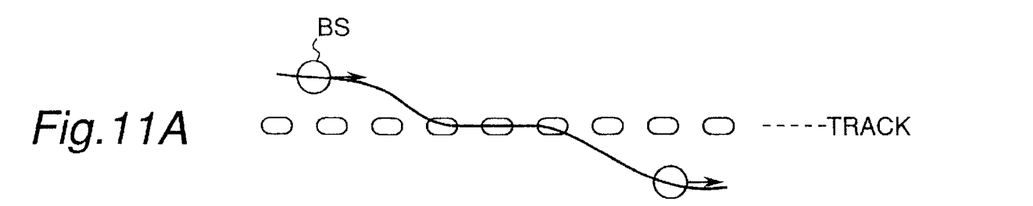
FIGS. 11A, 11B, 11C and 11D are graphs showing a trace of the beam spot and signals obtained when the beam spot changes from off the track on one side to on the track and then to off the track on the other side.
Figure 11B:
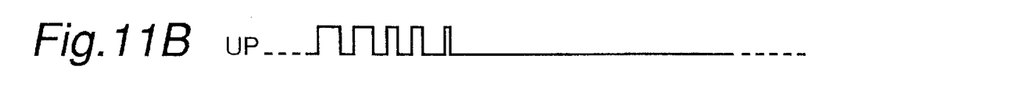
Figure 11C:
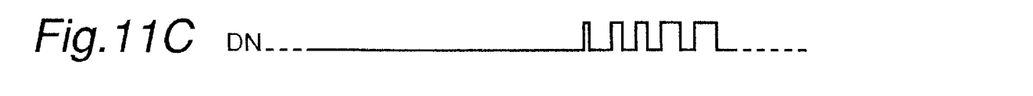
Figure 11D:
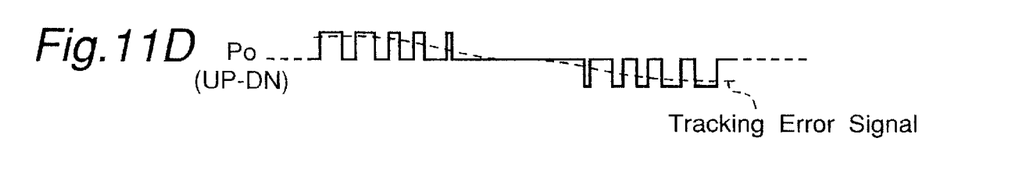

The difference signal Po is applied to a low pass filter 9 (FIG. 1) which smooths the difference signal Po, as shown by a dotted line in FIG. 11D, to be used as a tracking error signal.

The operation of the tracking error signal detector is described below.

As shown in FIG. 7, long and short pits at a normal recording density are aligned along the track and a beam spot BS traces over the track. The beam spot reflected from the track is sensed by the photodetector 1 having elements 1a, 1b, 1c, and 1d. In FIG. 7, three cases, CASE 1, CASE 2 and CASE 3 are shown. In CASE 1, the beam spot BS deviates on one side of the track. In CASE 2, the beam spot BS follows over the track. In CASE 3, the beam spot BS deviates on the other side of the track.

FIGS. 8A, 8B, 8C and 8D show waveforms obtained under CASE 1. Since power distribution of the reflected beam spot varies as if rotating clockwise on the photodetector 1, signal S2 leads with respect to signal S3, as shown in FIG. 8A, by a time equal to the difference between the time when the reflected beam spot impinges on the elements 1a and 1c and the time when the same impinges on the elements 1b and 1d. In the waveform shown in FIG. 8A, the length of the wave expanding in positive side corresponds to the length of the pit shown in FIG. 7. In the case where the beam spot scans the opposite side of the track like CASE 3, the power distribution varies counterclockwise on the photodetector 1, and the signal S3 leads with respect to the signal S2 as shown in FIG. 10A.

As shown in FIG. 1, signal S2 is produced from high pass filter 4a and is processed in circuits 5a and 6a, as will be described in detail later, and is changed to binary form Pa in the digitizing unit 7a in which the input signal is compared with a predetermined threshold. Similarly, signal S3 is produced from high pass filter 4b and is changed to binary form Pb in the digitizing unit 7b.

As shown in FIG. 11A, it is assumed that the beam spot BS changes tracking position from off one side of the track (CASE 1), on the track (CASE 2) and to off the other side of the track (CASE 3). During CASE 1, the pulses UP (FIG. 11B) are created in phase comparator 8. During CASE 2, neither pulse UP nor DN is created in phase comparator 8, and during CASE 3, pulses DN are created. Thus, the phase comparator 8 produces the difference signal Po as shown by FIG. 11D, and the low pass filter 9 produces the tracking error signal. By the use of the tracking error signal, a servo system (not shown) controls the tracking of the beam spot to be on the track.

Figure 12A:
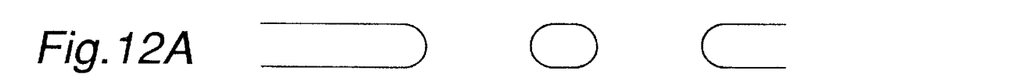
FIGS. 12A, 12B, 12C, 12D and 12E are graphs showing a short pit and the signals obtained from such a short pit.
Figure 12B:
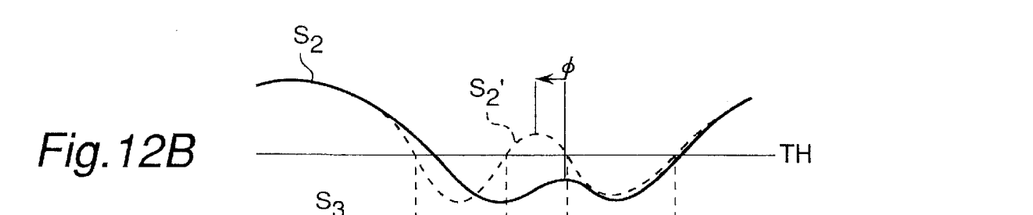
Figure 12C:
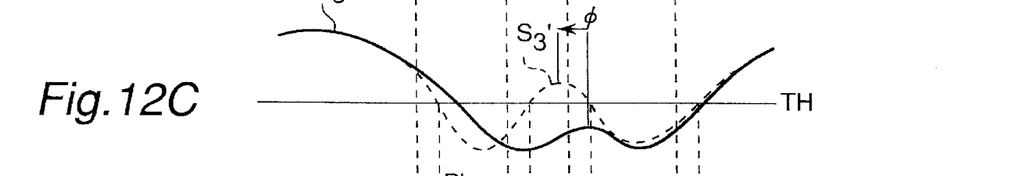

Referring back to FIG. 1, discussion is now directed to the boost filters 5a and 5b of the phase lead type. The boost filter is a kind of filter which increases the gain of amplification as the frequency of the input signal increases. For example, when a short pit occurs between long pits, as shown in FIG. 12A, the signal S2 or S3 from the high pass filter 4a or 4b, respectively, may not show a sufficient amplitude in waves representing the short pit, as shown by the solid lines in FIGS. 12B and 12C. Thus, in order to detect such a weak wave representing the short pit with the predetermined threshold TH in the digitizing unit 7a or 7b, it is necessary to increase the amplitude of the weak wave. The boost filter 5a or 5b is provided for this purpose. It is noted that the frequency of the signal S2 or S3 at a portion corresponding to the long pit is relatively low, and that the frequency at a portion corresponding to the short pit is relatively high. Thus, by using the boost filter, it is possible to amplify only the wave corresponding to the short pit.

In a general usage of the boost filter, e.g., for waveform equalizing, any phase shift should not be allowed in the amplifying process, because the phase shift causes jitters when reproducing information. The ideal boost filter that does not yield the phase shift needs a seventh or higher order filter.

Figure 12D:
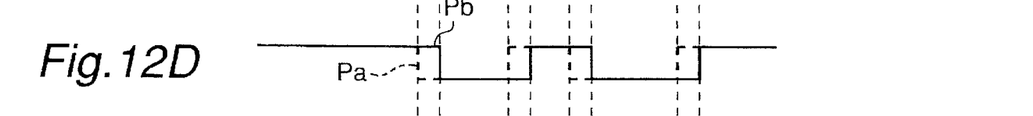
Figure 12E:
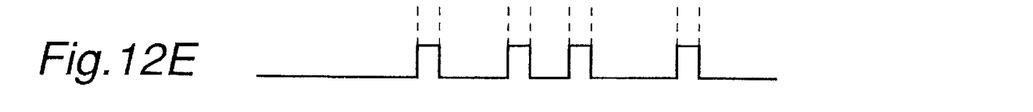

However, according to the present invention, by using the low order boost filters 5a and 5b with exactly the same phase shift characteristics, it is possible to realize boost filters of high boosting capacity without any problem although such low order filters accompany phase shifts. In the present invention, however, since the signals S2 and S3 experience the same amount of phase shift $\phi$ (FIGS. 12B and 12C) and since S2 and S3 are compared to each other in the later stage 8a, the phase shift $\phi$ is cancelled. The boost filter 5a amplifies the weak signal S2 to S2', and the boost filter 5b amplifies the weak signal S3 to S3'. The signals S2' and S3' are changed to binary forms Pa and Pb (FIG. 12D), respectively, in digitizing unit 7a, and the phase difference therebetween is obtained from the phase comparator 8. So when the signals S2' and S3', obtained from boost filters 5a and 5b, are changed to binary format and compared, the phase difference therebetween represents only the tracking error as detected by the photodetector 1. Note that the width of the pulses shown in FIG. 12E represents the amount of the tracking error from the center of the track.

As apparent from the above, the characteristics of the boost filters contribute the most to the effect of the present invention. Specifically, low frequency signals below the cut-off frequency $f_5$ are amplified using a constant gain level ($=G_0$), while high frequency signals above the cut-off frequency are amplified using a gain level proportional to the frequency. As described above, information is recorded on an optical disc as a series of variable length pits forming strings of the shortest pits and continuous strings of both short and long pits, and the read signals obtained by reading these pit strings include signals ranging in frequency from low (long pits) to high (short pits). Increasing the amplification gain at higher frequency ranges effectively boosts those signals reproduced from strings of short pits with a high gain level. Thus, strings of the shortest pits are boosted using the highest gain level. As a result, even the weak signals that are lost due to intersymbol interference, as is the case in the prior art, are obtained with sufficient amplitude, and the probability of false detection by the downstream phase comparator is sharply reduced.

Waveform equalization is one common means of emphasizing and boosting high frequency, low amplitude signals. However, a low order filter as shown in FIG. 2A is not generally considered to be a waveform equalization filter because waveform equalization not only emphasizes the high frequency component, but must also hold the same phase after the equalization processing. In other words, if the amplitude of the high frequency signal rises but the phase shifts (relative to the low frequency signal) and a phase distortion occurs as a result of amplitude boosting, the information cannot be correctly reproduced. As a result, a filter with a flat group delay characteristic, such as a Bessel filter or equi-ripple filter, is generally used. Using such a filter makes it possible to boost only the high frequency component without creating relative phase error between low and high frequency signals. It is, however, not possible to achieve a low order (1–2 order) group delay filter with a high boosting capacity, and therefore a seventh or higher order filter is required.

The filter shown in FIG. 2A according to the present invention, however, is generally known as a "phase lead filter", and is used when it is desirable to advance the phase of the high frequency signal relative to the low frequency signal. Specifically, when the frequency f is sufficiently high, $$G = j \cdot G_0 f / f_5 \qquad (5)$$

is derived from equation (2), and the phase is advanced 90° (¼ cycle) relative to the low frequency band. This has no effect, however, in the case of the present invention. This is because, as will be shown from FIG. 1, the signals processed by boost filters 5a and 5b, which have identical characteristics, were originally used for comparison with each other. An equal phase lead is thus introduced to both signals by the boost filters, and the phase lead is therefore effectively nulled by the phase comparison operation. The phase lead filter of the present invention in practice, therefore, operates only as a boost filter by boosting only the high frequency component with a high gain level.

A phase lead filter is used as the boost filter rather than a group delay filter because a low order, high boost capacity can be achieved. Furthermore, the high frequency side of the phase lead filter (the frequency band exceeding the cut-off frequency) creates a first order differential characteristic as shown in equation (5) with a high 20 dB/dec boost characteristic. Using a group delay filter requires not only a high order operation, but can achieve a high boost characteristic only in an extremely limited frequency band. This means that when the rotational speed of the optical record carrier varies greatly, the frequency of the shortest pit series reproduction signal also varies and may deviate from the boostable frequency range of the group delay filter. In an apparatus for detecting a tracking error signal from a high density optical record carrier according to the present invention, the spindle motor speed may change before the tracking servo operates, and the reproduction apparatus must be robust for frequency deviation caused by uncontrolled motor fluctuation. The phase lead filter of the present invention exhibits the same differential characteristic for all frequencies exceeding the cut-off frequency, and can therefore achieve the desired boost characteristic across a wide frequency band.

However, if the high frequency gain is increased without a limit, high band noise may also increase. It is therefore necessary to limit signal boosting to a certain frequency level for which the low-pass filter 6a is used. Specifically, at frequencies higher than the cut-off frequency $f_6$, the differential characteristics of the boost filter 5a (i.e., the phase lead filter) and the low-pass filter 6a (i.e., the phase lag filter) cancel each other, resulting ultimately in a constant gain level.

The basic characteristics of the filters used in the present embodiment are described above. Specific numeric examples used by these filters are described briefly below. First, if the signal band of the diagonal sum signals, which are the separate outputs of the data read signals, is in the range 1–10 MHz, the cut-off frequency $f_4$ may be a sufficiently low value as described above, and is set to approximately 10 kHz. The cut-off frequency $f_5$ is the starting frequency for signal boosting, and may be set at approximately the middle of the signal band, thus a frequency of approximately 5 MHz is appropriate. The cut-off frequency $f_6$ may be set sufficiently higher than the highest signal frequency, and a frequency of approximately 20 MHz is appropriate. It is to be noted that the gain drops naturally due to the signal bandpass characteristics of the buffer amplifier even when filters with these cut-off frequencies are not used.

In an apparatus for detecting a tracking error signal from a high density optical record carrier based on the phase difference between the diagonal sum output signals of the parted photodetectors according to the preferred embodiment of the present invention described above, the tracking error signal can thus be detected with a high S/N ratio even from high density optical record carriers by using a first-order phase lead filter as the boost filter for both signal channels.

Figure 3:
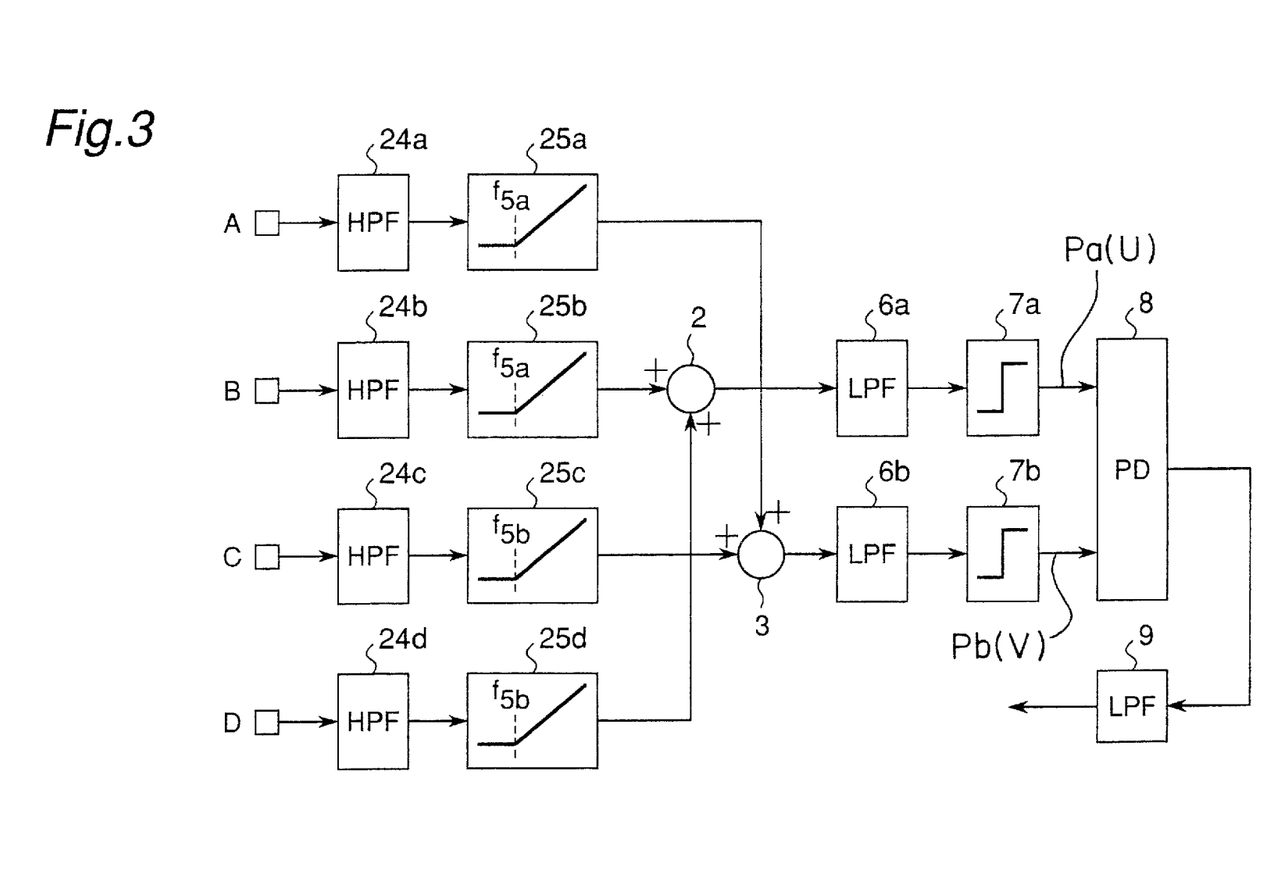
FIG. 3 is a block diagram of an apparatus for detecting a tracking error signal from a high density optical record carrier according to the second embodiment of the present invention.

The second embodiment of the present invention is described next below with reference to FIG. 3. As shown in FIG. 3, discrete high-pass filters 24a, 24b, 24c, and 24d remove the DC components of the photodetector element output signals $S_A$, $S_B$, $S_C$, and $S_D$ of the divided photodetector (not shown in the figure). It is to be noted that the divided photodetector of this embodiment is identical to that of the first embodiment and described above. Furthermore, the adders 2 and 3, low-pass filters 6a and 6b, digitizing units 7a and 7b, phase comparator 8, and low-pass filter 9 are also identical to those of the first embodiment above. The second embodiment differs from the first in that the discrete boost filters 25a, 25b, 25c, and 25d are provided for the photodetector element output signals $S_A$, $S_B$, $S_C$, and $S_D$, and the cut-off frequency $f_{5a}$ of boost filters 25a and 25b is different from the cut-off frequency $f_{5b}$ of boost filters 25c and 25d.

The operation of an apparatus for detecting a tracking error signal thus comprised according to the second embodiment of the present invention is described next.

The problem presented by detecting the tracking error signal using the diagonal sum signals of the divided photodetector is the phase difference in the direction tangential to the track ($S_A \to S_D$, $S_B \to S_C$) when the height (i.e., depth) of the data pits formed in the optical record carrier is less than $\lambda/4$ (where $\lambda$ is the wavelength of the laser beam). This phase difference does not contain a rotational component and therefore does not act as a direct external interference with the tracking error signal detection, but it does lower the detection sensitivity and the S/N ratio. Therefore, the present embodiment causes these phase differences to electrically compensate for each other.

If the boost filters 25a, 25b, 25c, and 25d are phase lead filters as shown in FIG. 2, the phase of each photodetector element output signal can be varied so that the signals compensate for each other by shifting the cut-off frequency sufficiently to prevent any effect on the boost characteristics. This is why the cut-off frequencies of the photodetector elements 1a, 1b and 1c, 1d divided on a tangential line are different.

Figure 5A:
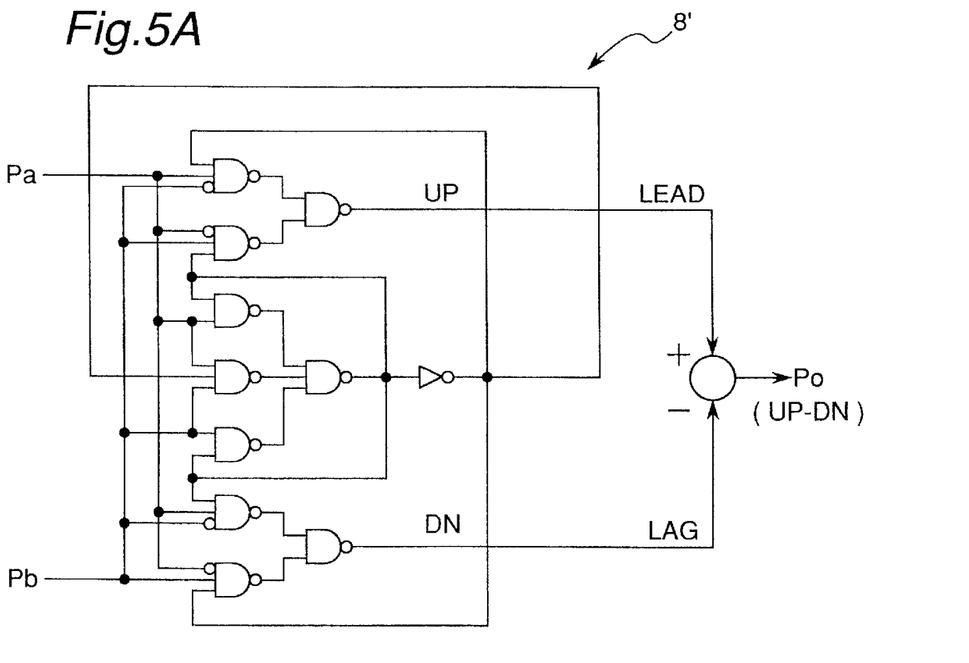
FIG. 5A is a circuit diagram of a modification of the phase comparator shown in FIG. 1.

Referring to FIG. 5A, a modified phase comparator 8' is shown.

With the phase comparator 8 shown in FIG. 4, however, detection errors occur when there is an error (pulse loss) in either pulse signal Pa or Pb, this error is then propagated, and an extremely high false tracking error signal is generated. For example, in the case of comparator 8, if there is an error (pulse loss) in the pulse signal Pb, output UP becomes HIGH when a pulse signal Pa is applied, and remains HIGH until the next pulse signal Pa is input. To prevent this, prior systems (not shown) provided additional circuitry to detect the missing pulses and invalidated the phase comparator output when a signal error was detected. One method for detecting missing pulses is to determine whether another pulse is input within a predetermined gate time after one pulse signal is input.

In the above prior systems, however, if the signal frequency changed due to a significant variation in the speed of the spindle motor driving the optical record carrier as described above, pulse signals that would normally be detected were not input within this set gate time, and were therefore processed as pulse signals containing a pulse error. The modified phase comparator 8' shown in FIG. 5A is capable of minimizing detection errors due to pulse errors without using a gate.

Figure 5B:
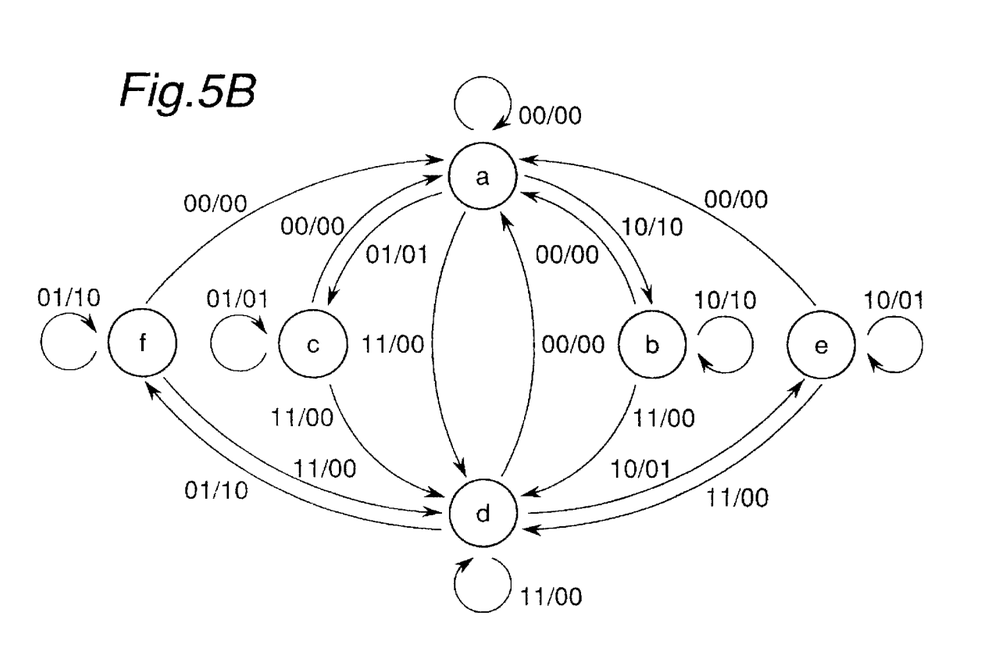
FIG. 5B is a state transition diagram for the phase comparator shown in FIG. 5A.

FIG. 5A is a circuit diagram of a modified phase comparator 8' according to the present invention, and FIG. 5B is a state transition diagram for this phase comparator 8'. Referring to FIG. 5B, nodes a, b, c, d, e, and f each represents a state; Pa and Pb in FIG. 5A refer to UP and DN, respectively. The operation of this state transition diagram is described next with reference to FIG. 6. Case 1, in which signal Pa leads signal Pb, is described first.

Figure 6:
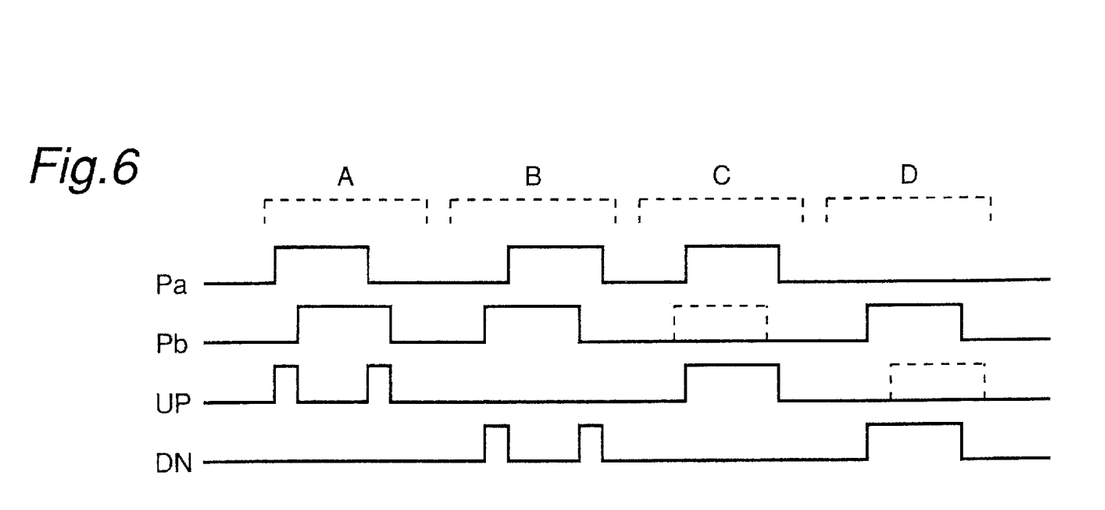
FIG. 6 is a timing chart used to describe the operation of the phase comparator shown in FIG. 5A.

State a is the state in which both signals Pa (also indicated as U) and Pb (also indicated as V) are 0 (LOW), at which time there is no signal output. When signal Pa then rises first, output UP becomes 1 (HIGH) (U:V/UP:DN=10/10), and the state changes to state b. When signal Pb then rises, UP becomes 0 (U:V/UP:DN=11/00), and the state changes to state d. What this means is that the state transition a→b→d causes a pulse signal with a pulse width equivalent to the phase lead of the signal Pa rise relative to the signal Pb rise to be output to output UP. When the state then changes d→f→a, the phase difference pulse of the trailing edges of both inputs is output to output UP. The phase delay is processed similarly: the leading edge is detected when the state changes from a→c→d, the trailing edge is detected when the state then changes from d→e→a, and the phase difference pulse signal is supplied to output DN (FIG. 6).

The operation, when pulses are dropped, is described next starting with a dropout in signal Pb. In this case the state changes from a→b→a, and a pulse signal of the same width as signal Pa is output to output UP as shown in FIG. 6 (C). This signal is effectively noise, but the state is reset to a and there is, therefore, no effect on the subsequent phase comparison. While the state changes from a→c→a when a dropout occurs in signal Pa, the effect described above is again obtained.

The operation described above can be achieved electrically by designing a state machine embodying the above state transition diagram. States a–f can be expressed using three bits (S1:S2:S3), and the circuit design can be simplified by defining the two low bits (S2:S3) to match outputs UP and DN.

|  | S1 | S2 | S3 |
|---|---|---|---|
| State a | 0 | 0 | 0 |
| State b | 0 | 1 | 0 |
| State c | 0 | 0 | 1 |
| State d | 1 | 0 | 0 |
| State e | 1 | 0 | 1 |
| State f | 1 | 1 | 0 |

The logic equations achieving the above state transitions are shown as equations (6), (7), and (8) below.

$$S1 = U \cdot S1 + V \cdot S1 + U \cdot V \cdot !S1 \quad (6)$$

$$S2 = U \cdot !V \cdot !S1 + !U \cdot V \cdot S1 \quad (7)$$

$$S3 = !U \cdot V \cdot !S1 + U \cdot !V \cdot S1 \quad (8)$$

where U represents signal Pa, V represents signal Pb, · represents a logic AND operation, + represents a logic OR operation, and ! represents a NOT operation. Outputs UP and DN are thus

UP=S2

DN=S3 and the difference signal UP − DN of output signals UP and DN is the desired phase comparison signal, and is produced as signal Po from the phase comparator 8'.

By thus providing state transition characteristics as shown in FIG. 5B, a logic circuit as shown in FIG. 5A, or a design that can be expressed by equations (6), (7) and (8), the detection error is not propagated even when a pulse signal error occurs, and a phase comparator minimizing false detection signals can be achieved.

While logic circuits other than that shown in FIG. 5A can be derived from the state transition diagram shown in FIG. 5B, it will be obvious that the object of the present invention is found in the state transition diagram shown in FIG. 5B. Because all logic equations derivable from this state transition diagram can be obtained from each other by appropriate modification, logic equations (6), (7) and (8) are representative of all the configurations derivable from the state transition diagram shown in FIG. 5B.

The present invention thus described amplifies the reproduction signals of the shortest mark lengths using a higher gain level than for the continuous mark reproduction signals by providing a first high frequency emphasis filter and a second high frequency emphasis filter between the phase comparator and the outputs of the first and second photodetector element groups, respectively. The reproduction amplitude of the shortest marks is thus relatively higher than that of the continuous marks, digital pulse signal dropout caused by intersymbol interference can be prevented, and the tracking error signal can thus be detected with a high S/N ratio.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for detecting a tracking error signal from recorded bit information of a high density optical record carrier on which a laser beam is emitted to a data track area to produce a reflection beam carrying the recorded bit information on the optical record carrier, said apparatus comprising:

a divided photodetector having a first divided portion and a second divided portion disposed in a light path of the reflection beam from the optical record carrier, said divided photodetector producing a first photodetector signal from said first divided portion and a second photodetector signal from said second divided portion, wherein said first photodetector signal and said second photodetector signal both contain the recorded bit information;

a phase comparison means for detecting a phase difference between said first and said second photodetector signals, and for producing a phase difference signal which is a tracking error signal;

a first low-order phase lead filter located between said first divided portion and said phase comparison means for amplifying a high frequency component of said first photodetector signal and shifting a phase of the high frequency component of said first photodetector signal; and a second low-order phase lead filter located between said second divided portion and said phase comparison means for amplifying a high frequency component of said second photodetector signal and shifting a phase of said high frequency component of said second photodetector signal in substantially a same amount and in a same direction as the high frequency component of said first low-order phase lead filter;

wherein said first and second low-order phase lead filters are characterized by a transfer function $G=G_o(1+jf/f_5)$, wherein $G_o$ is a gain and $f_5$ is a cut-off frequency which is set at an approximate middle of a frequency band of the recorded bit information.

2. An apparatus according to claim 1, further comprising a low-pass filter for removing a ripple component from the phase difference signal.

3. An apparatus according to claim 1, wherein said first and second low-order phase lead filters are identical in structure.

4. An apparatus according to claim 1, wherein said divided photodetector is divided into four parts by orthogonal parting lines which form first, second, third, and fourth photodetector elements, said first divided portion is defined by diagonally located said first and said third photodetector elements, and said second divided portion is defined by diagonally located said second and said fourth photodetector elements.

5. An apparatus according to claim 1, wherein said phase comparison means comprises:

a logic circuit means for generating signals S1, S2, and S3 by executing logic operations $S1 = U \cdot S1 + V \cdot S1 + U \cdot V \cdot !S1$ $S2 = U \cdot !V \cdot !S1 + !U \cdot V \cdot S1$ $S3 = !U \cdot V \cdot !S1 + U \cdot !V \cdot S1$ wherein U is a first photodetector signal applied to one input of said phase comparison means, V is a second photodetector signal applied to another input of said phase comparison means, · represents a logic AND operation, + represents a logic OR operation, and ! represents a NOT operation, and a subtractor for obtaining a difference signal for signals S2 and S3, and outputting the difference signal as the phase difference signal.

* * * * *